May 12, 1959 W. GLAMANN 2,885,907
DRIVING MECHANISM FOR AN ENGINE CONTROLLED
BRAKING SYSTEM FOR AUTOMOTIVE VEHICLES
Original Filed Jan. 5, 1954

INVENTOR.
WILHELM GLAMANN

BY *Robert E. Burns*

ATTORNEY.

United States Patent Office 2,885,907
Patented May 12, 1959

2,885,907

DRIVING MECHANISM FOR AN ENGINE CONTROLLED BRAKING SYSTEM FOR AUTOMOTIVE VEHICLES

Wilhelm Glamann, Lyons, France

Original application January 5, 1954, Serial No. 402,377, now Patent No. 2,804,063, dated August 27, 1957. Divided and this application November 13, 1956, Serial No. 626,789

Claims priority, application Germany January 5, 1953

4 Claims. (Cl. 74—665)

This application is a division of my application Serial No. 402,377, filed January 5, 1954, now Patent No. 2,804,063 of August 27, 1957.

My invention relates to improvements in the control of auxiliary means cooperating with internal combustion engines, chiefly for driving supercharging and braking devices through the engine.

The arrangement according to my present invention includes chiefly a distributing mechanism such as an epicycloidal gear the outer ring gear of which drives through the agency of an auxiliary change speed gear various auxiliaries, such as a fan and an oil pump and more particularly supercharging and braking compressors. The control of last mentioned apparatuses is designed in a manner such that said apparatuses are driven selectively by the distributing mechanism or directly by the output shaft of the engine, according as to whether the vehicle is driven by the engine or else by its wheels running under freewheeling conditions.

The direct drive of the auxiliaries is operative for instance when the distributing mechanism is locked and it is necessary to provide for the rotation of certain auxiliary apparatuses the operation of which is essential for the running of the engine. By inserting unidirectional coupling means in the kinematic chain leading to the auxiliary apparatuses, the latter may be driven so as to revolve always in the same direction, whatever may be the conditions governing the running of the vehicle.

According to a preferred embodiment of my invention, in a vehicle propelled by an internal combustion engine, which possesses some various auxiliary apparatuses, and particularly supercharging and braking compressors, a rapid and powerful braking of the vehicle may be obtained by driving the braking compressor which provides for a supercharging of the exhaust through the agency of an epicycloidal gear.

This cuts out the risk of an insufficiently rapid braking and of a premature emptying of the compressed air container. As a matter of fact, the control means, operating through the agency of an epicycloidal gear, drive, on one hand, the braking compressor at a rate which is all the higher when the braking of the vehicle is more marked and it provides, on the other hand, when the vehicle is on a declivity, the constancy of the braking power required, independently of the speed assumed by the vehicle.

I will now describe, by way of example and by no means in a limiting sense, various embodiments according to my invention, reference being made to the accompanying drawings, wherein.

Figure 1:
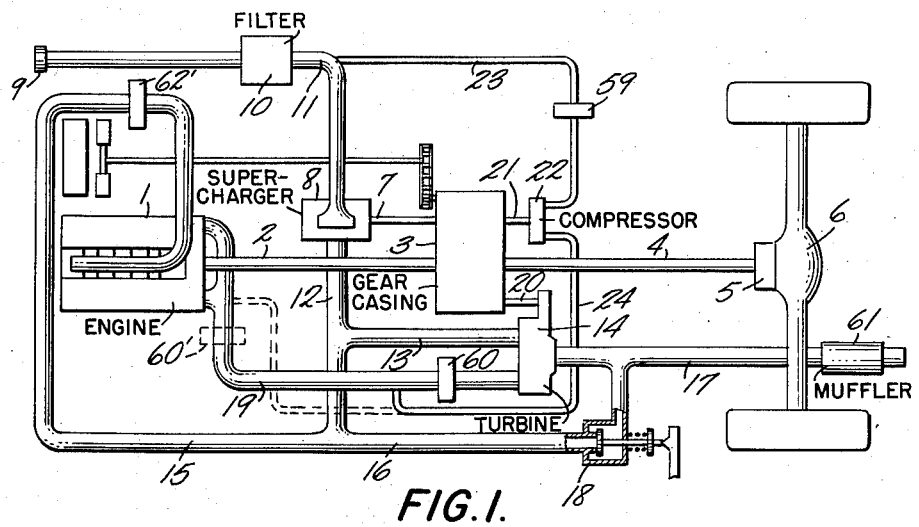
Fig. 1 is a diagrammatic plan view of the vehicle-driving means.

Turning to Fig. 1, the internal combustion engine 1 drives through its shaft 2 a power-distributing mechanism contained inside the casing 3, said mechanism driving in its turn, on one hand, through the shaft 4, the change speed gear 5 and the rear axle 6 and, on the other hand, through the shaft 7, a supercharger 8.

The supercharger 8 sucks in air through the port 9, the filter 10 and the pipe 11. It delivers the compressed air into the pipe 12, said air being then distributed, according to the conditions of running, into the pipe 13 so as to drive a turbine 14, into the pipe 15 for supercharging the engine 1 and into the pipe 16 for exhaust through the pipe 17 after passage of the air through the discharge means 18.

The turbine 14 which is also driven by the exhaust gases passing out of the engine and through the pipe 19, delivers said gases into the above-mentioned exhaust pipe 17 and cooperates further in driving, through the shaft 20, the distributing mechanism contained inside the casing 3. Said mechanism controls, moreover, in the embodiment which is being described, a shaft 7' driving the braking compressor 22 which is fed with air through the pipe 23 opening into the pipe 11, the compressed air produced by the compressor being delivered into the pipe 24 opening into the exhaust pipe 19. The system shown in Fig. 1 also includes a throttling member 60 which may be positioned as indicated at 60' when the pipe 24 communicates with pipe 19 as indicated in broken lines, a muffler 61 and an engine intake control 62'.

Figure 2:
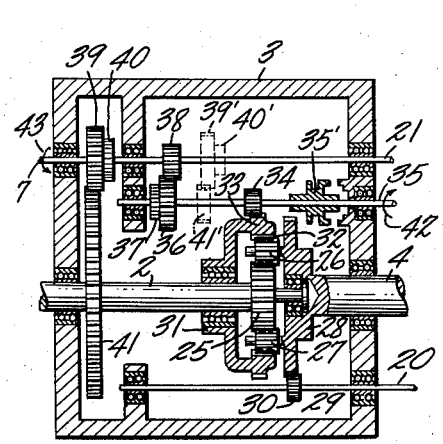
Fig. 2 illustrates the mechanism distributing the driving power.

The power distributing mechanism is shown, with further detail, in Fig. 2. The transmission shaft 2 controlled by the engine terminates inside the casing 3 and carries at its end inside said casing the inner sunwheel 25 of an epicycloidal gear. The planet pinions 26 and 27 meshing with said sunwheel revolve over a planet carrier 28 rigid with the transmission shaft 4 leading to the wheels. Said carrier 28 is provided also on its outer surface with a series of teeth 29 meshing with a pinion 30 rigid with the shaft 20 controlled in its turn by the turbine 14.

A ring gear 31 is freely revoluble on the transmission shaft 2, and the teeth 32 formed on its inner surface mesh with the planet pinions 26 and 27 while the outer series of teeth 33 on said ring gear 31 mesh with the gearwheel 34 rigid with the intermediate shaft 35. The latter carries also a gearwheel 36 rigid with a freewheel illustrated diagrammatically at 37, said gearwheel 36 meshing with a gearwheel 38 rigid with the shaft 7. The latter carries also a pinion 39 rigid with a free-wheel 40 and meshing with a large gear-wheel 41 rigid with the transmission shaft 2.

The mechanism executed in accordance with my invention has for its object to make the auxiliary apparatuses revolve in a same direction both when the drive is transmitted to the distributing mechanism through the shaft 2, i.e. by the engine, and when the shaft 4 forms the driving means, i.e. when, for instance, the vehicle is free-wheeling while the engine is idling.

Lastly, the auxiliaries are driven directly by the shaft 2 whenever the distributing mechanism is locked, as provided for instance by engagement of the locking clutch 35' on the intermediate shaft 35.

To this end, the mechanism operates in the following manner: the transmission shaft 2 being assumed to drive the distributing mechanism, the intermediate shaft 35 will revolve, for instance, in the direction illustrated by the arrow 42. The free-wheel 37 locks then the gearwheel 36 onto the intermediate shaft so that the shaft 7 driving the compressor revolves in the direction of the arrow 43. The transmission ratio in the distributing mechanism is such that the pinion 39 driven by the large gearwheel 41 revolves at a lower speed than the cooperating free-wheel 40 and the shaft 7 carrying the latter.

In contradistinction, when the action of the transmission shaft 4 predominates, in the drive of the epicycloidal gear, the shaft 35 revolves in a direction opposed to that of the arrow 42 and the unidirectional coupling of the free-wheel 37 provides no longer for a drive of the gear-wheel 36. On the other hand, the pinion 39 drives through the associated free-wheel 40 the shaft 7 in the direction of the arrow 43. The same result is obtained when the intermediate shaft 35 is locked through operation of the locking clutch 35'.

Figure 3:
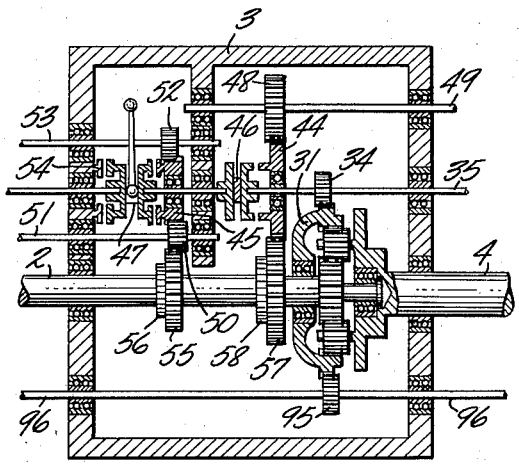
Fig. 3 illustrates a different embodiment of the distributing mechanism.

A different embodiment of the distributing mechanism is illustrated in Fig. 3. The shaft 2 driven by the engine controls as described above the transmission shaft 4 leading to the rear axle, through the agency of an epicycloidal gear while the outer ring gear 31 of said gear meshes with a gear-wheel 34 rigid with the intermediate shaft 35. In this embodiment, two gear-wheels 44 and 45 are mounted loose on the shaft 35 and are associated with two clutches 46 and 47 of the dog-clutch type, as illustrated in the case of the clutch 46, or of the friction type, as illustrated in the case of the clutch 47. The gear-wheel 44 meshes with a gear-wheel 48 rigid with a shaft 49 controlling an auxiliary apparatus while the gear-wheel 45 meshes, on one hand, with the gear-wheel 50 on the shaft 51 controlling the supercharger and, on the other hand, with the gear-wheel 52 on the shaft 53 controlling a third auxiliary apparatus. The clutch 46 illustrated in its inoperative position is adapted to drive the gear-wheel 44 when it is shifted towards the right hand side of the mechanism as illustrated, while the clutch 47, also illustrated in its neutral position, is likewise adapted to carry along with it in its rotation the gear-wheel 45 when it is shifted towards the right hand side of Fig. 3, or again, said clutch 47 may serve for holding fast the intermediate shaft 35 through cooperation with a friction lining 54 rigid with the casing. The shaft 2 also carries a gear wheel 55 mounted on the freewheel 56 and a gear-wheel 57 mounted on the free-wheel 58. The gear-wheels 55 and 57 are adapted to cooperate respectively with the gear-wheel 50 on the shaft 51 and with the gear-wheel 44 on the shaft 35 respectively.

The operation of the mechanism is as follows:

As long as the vehicle-driving engine forms the actual driving means for the vehicle, the shaft 49 is controlled through the ring gear 31, the pinion 34, the intermediate shaft 35, the clutch 46, the gear-wheel 44 and the pinion 48 on the shaft 49, while the shafts 51 and 53 are driven through the same ring gear 31, the pinion 34, the intermediate shaft 35, the clutch 47, the gear-wheel 45 and finally the pinions 50 and 52 respectively. The gear-wheels 55 and 57 revolve during this time freely round the shaft 2. If, in contradistinction, the epicycloidal gear is driven chiefly by the shaft 4 and the wheels of the vehicle, while the clutches 46 and 47 are inoperative, or again, if the intermediate shaft 35 is held fast by a shifting towards the left of the clutch 47, the auxiliary apparatuses are driven, on one hand, by the gear-wheels 57, 44 and 48, and, on the other hand, by the gear-wheels 55, 50, 45 and 52.

In this embodiment, and also in that disclosed with reference to Fig. 2, the ring gear 31 of the epicycloidal gear may revolve freely in a direction opposed to that of its normal rotation, as long as the intermediate shaft 35 is not held fast purposely, without the rotation of the auxiliary apparatuses being reversed thereby. The vehicle remains unbraked by the engine under such conditions, while it is running freely, and this control of the vehicle is consequently equivalent to an arrangement including a free-wheel fitted at the outer end of the rear axle. The advantage of the arrangement described resides in the fact that, in the embodiment according to my invention, only the torque driving the auxiliary apparatuses is transmitted through the unidirectional driving means, whereas a free-wheel arrangement inserted in the vehicle-controlling transmission would assume a larger size since it would have to transmit the total driving torque.

The advantages of an economical running of the vehicle under free-wheeling conditions leads, however, to the drawback of an absence of braking by the engine in declivities and when the vehicle is running on its inertia. According to my invention, I restore a certain amount of braking by locking the intermediate shaft 35 (Figs. 2 and 3) as provided by the engagement of dog-clutches such as 35' (Fig. 2) or of friction clutches such as 47 (Fig. 3) with stationary cooperating parts rigid with the casing enclosing the distributing mechanism.

An efficient braking of the vehicle is obtained in accordance with the invention by means of a further braking compressor.

The braking compressor 22 (Fig. 1) is driven in the embodiment illustrated in Fig. 2, by the output end 7' of the shaft 7. The intermediate shaft 35 carries for this purpose a pinion 41' driving a gear-wheel 39' carried by a free-wheel 40' on the shaft 7. The directions for which the free-wheels 37 and 40' are locked with reference to the direction of rotation of the ring gear 31 of the epicycloidal gear, are opposed. The operation of the arrangement is such that the wheel 40 revolves freely, as long as the driving stress is provided by the shaft 2, while said wheel 40 drives the shaft 7 and the braking compressor when the output shaft 4 provides said driving stress.

The speed of rotation of the shaft 7 is thus modified at the moment of braking as well as the direction of rotation of said shaft. In order to make the gear-wheels 39 and 41 operate as described, it is necessary to substitute for the single shaft 7 two coaxial shafts connected with each other through the free-wheel 40, so that the stub shaft 7 may be independent of the stub shaft 7', when the direction of rotation is reversed.

The braking compressor is driven by the shaft 49, in the case of the embodiment illustrated in Fig. 3. The intermediate wheel 44 is then mounted on a free-wheel or cooperates with releasable driving means, as illustrated in Fig. 3.

The braking compressor may also be driven by the shaft 35 (Fig. 2) which requires, in this case, the cutting out of the unidirectional arrangement such as 40', since the pinion 34 should be rigid with the shaft 35 in order to fulfill all its functions.

The supercharger cooperating with the engine, may also act as a braking compressor. The compressor is, in this case, driven by the single shaft 7 (Fig. 2) passing through the casing containing the distributing mechanism, the drive of the compressor in one case being provided by the gears 36 and 38 and in the other case, by the gears 41' and 39'. The output end 7' of the shaft 7 may drive e.g. a further supercharger for the engine.

Whenever, in one of the above described embodiments, it is desired to drive the braking compressor only when the brakes are to be applied, it is sufficent to connect the dog clutch 46 (Fig. 3) with control means operating same at the moment of said application of the brakes, so as to engage then one of its teeth with the teeth of the gear wheel 44 mounted loose on the intermediate shaft 35. The gear wheel 44 drives then the gear wheel 48 rigid with the shaft 49 controlling the compressor.

I claim:

1. A device for controlling auxiliary apparatus units of an internal combustion engine of an automotive vehicle through a power distributing mechanism connected to receive power from said engine, said engine having an output shaft, and said auxiliary apparatus units including at least one compressor, said device comprising an epicycloidal step-up gear mechanism driven from said output shaft, means connected to said step-up gear for driving at least one of said auxiliary apparatus units, said means including unidirectional transmission means connected to maintain the direction of rotation of the driven auxiliary apparatus unit constant, said means providing for selective driving of said units from said output shaft or from said step-up gear.

2. A device as defined in claim 1, wherein said epicycloidal step-up gear mechanism includes gears and shafts and said device further comprises means in said step-up gear mechanism for driving said auxiliary apparatus units in response to the conditions of operation of said vehicle, said last-named means being selectively responsive to unidirectional free-wheel devices disposed between the gears and the shafts of said epicycloidal step-up gear mechanism and on the shafts driving said auxiliary apparatus units.

3. A device as defined in claim 2, wherein said vehicle has a brake pedal and further comprising clutches including toothed wheels normally mounted for free rotation on their respective shafts and engagement of said clutches with the shafts is controlled by the brake pedal.

4. A device as defined in claim 3, wherein said step-up gear mechanism includes an intermediate shaft and means for locking said shaft against rotation comprising a clutch controlled by said brake pedal.

References Cited in the file of this patent

UNITED STATES PATENTS

| | | |
|---|---|---|
| 2,056,050 | Harris | Sept. 29, 1936 |
| 2,661,935 | Willard | Dec. 8, 1953 |
| 2,769,303 | Lucia | Nov. 6, 1956 |